June 12, 1934.
W. R. GRISWOLD
1,962,191
TRANSMISSION MECHANISM
Filed Jan. 19, 1932
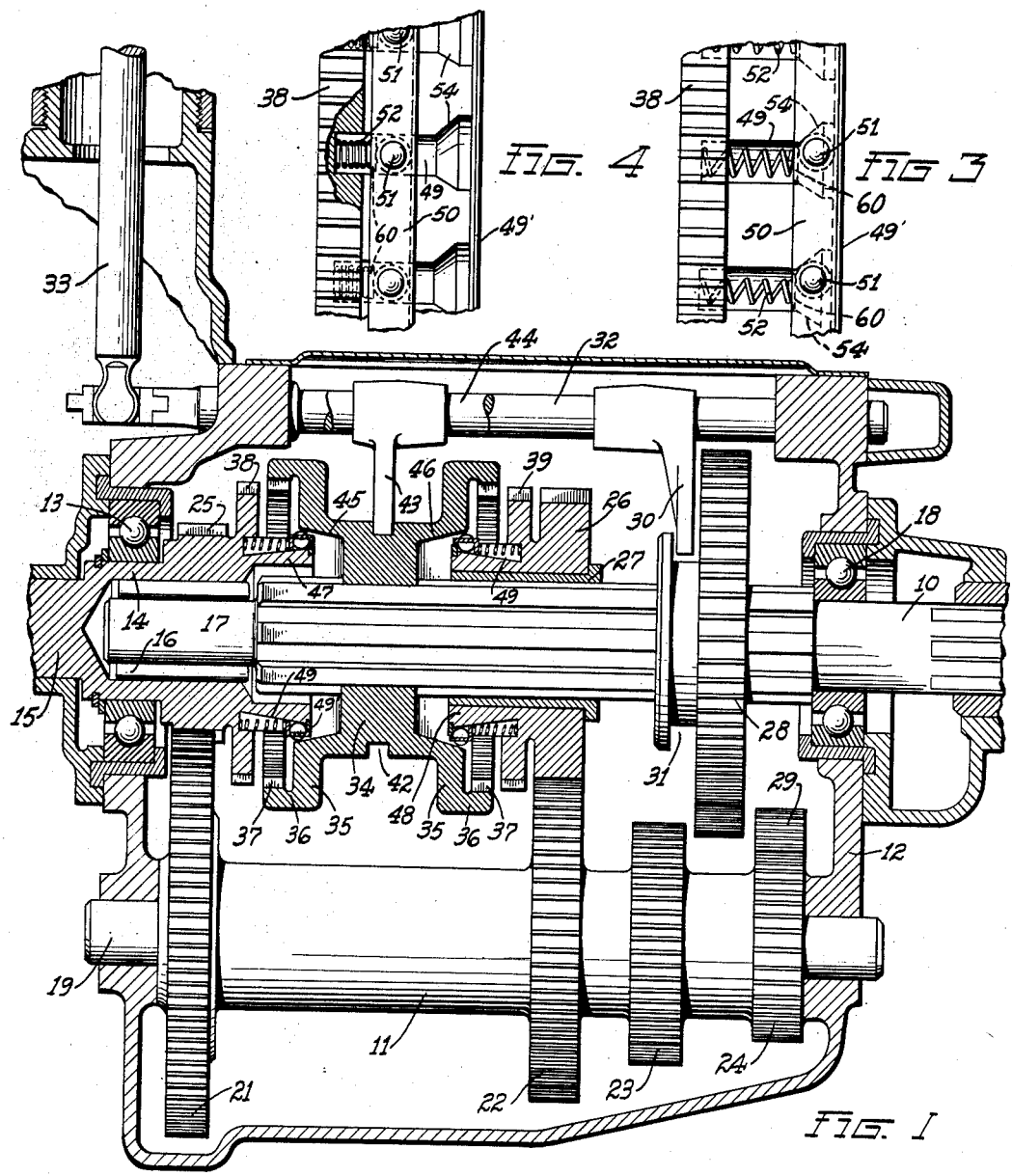
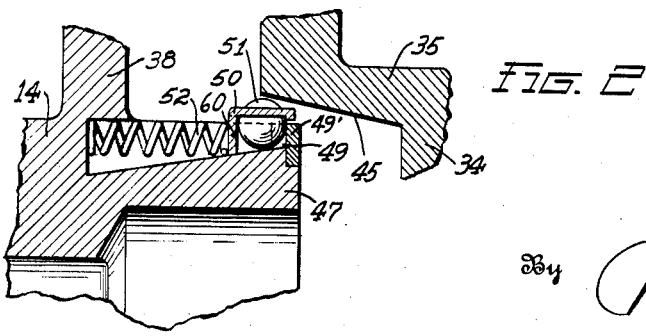
Inventor
WALTER R. GRISWOLD
By Milton Tibbetts
Attorney Patented June 12, 1934

1,962,191

UNITED STATES PATENT OFFICE 1,962,191

TRANSMISSION MECHANISM

Walter R. Griswold, Detroit, Mich., assignor to Packard Motor Car Company, Detroit, Mich., a corporation of Michigan Application January 19, 1932, Serial No. 587,560

11 Claims. (Cl. 192—53)

This invention relates to motor vehicles and more particularly to the transmission mechanism of such vehicles.

In the operation of motor vehicles, it is requisite to smooth gear changing that the gears which are to be meshed be brought to the same or substantially the same peripheral speed before engagement of the gear teeth. Thus after disconnection of the vehicle clutch and the previously meshed gears of a conventional transmission, the operator must either wait for a more rapidly moving gear element to lose speed, or in some instances must accelerate a more slowly moving gear by reconnecting it to the engine through the clutch. These maneuvers require a considerable measure of skill on the part of the operator and also prevent the free and rapid changing from one gear train to another as the contingencies of vehicle operation may dictate, so that gear changing has come to be considered as perhaps the most difficult task incident to the operation of a motor vehicle.

To assist the operator in making rapid and quiet shifts, it has been previously proposed to synchronize the gears to be meshed by various means, such as friction clutches. Such devices, however, have been open to certain objections. The mechanisms employed have been in general cumbersome and complicated. Frequently the friction elements have not been applied with sufficient pressure to effect proper synchronization within the very short time interval available for this purpose.

One of the objects of this invention is to provide a motor vehicle transmission having an improved device for synchronizing the gear elements which is simple and effective.

Another object of the invention is to provide a motor vehicle transmission with a device in which friction devices of a roller type will be effective to synchronize the clutch elements and which will release prior to clutch engagement.

A further object of the invention resides in a new and novel form of rolling friction means for synchronizing a motor vehicle transmission mechanism prior to clutching operation in the gear train.

Other objects of the invention will appear from the following description taken in connection with the drawing, which forms a part of this specification, and in which:

Fig. 1 is a view partially in side elevation and partially in vertical section through a motor vehicle transmission constructed in accordance with the invention;

Fig. 2 is a fragmentary sectional view showing one of the synchronizing devices in disengaged relation;

Fig. 3 is a fragmentary plan view showing the synchronizing devices in effective position, with the clutch hub removed;

Fig. 4 is a similar fragmentary view showing the synchronizing devices in their ineffective position, when the clutch is in engagement;

Referring to the drawing, in Fig. 1 is shown a motor vehicle transmission comprising a splined transmission shaft 10 and a countershaft or gear spool 11, mounted in a housing or transmission case 12. The front wall of the housing carries a suitable bearing 13 in which is mounted the enlarged rear end 14 of a driving shaft 15, which may be the vehicle clutch shaft, driven from the vehicle engine through conventional clutch mechanism (not shown). The enlarged end 14 of the clutch shaft is formed with an axial recess for the reception of a bearing 16, in which the reduced forward end 17 of the transmission shaft 10 is journaled. The rear end of the shaft 10 is journaled in a bearing 18, supported in the rear wall of the housing 12, and is connected in the usual way to the propeller shaft to drive the vehicle, this connection not being shown.

The countershaft 11 is in the form of a hollow spool, mounted to rotate on an arbor 19, supported at its ends by the transmission case walls, and this spool is formed with a number of integral gears 21, 22, 23 and 24. Of these, the gear 21 is in constant mesh with a gear or pinion 25, formed on the enlarged end 14 of the shaft 15, so that the countershaft 11 is continuously connected to and driven from the clutch shaft 15 in the well known manner. The gear 22 is also continuously in mesh with a gear 26 which is mounted for rotation on a bearing sleeve 27, pressed or otherwise rigidly mounted on the shaft 10, as will be readily understood.

Gears 23 and 24 constitute the low speed and reverse gears respectively, and are adapted to drive the gear 28 which is splined to and slidable on the shaft 10, this gear 28 being directly engageable with the gear 23. It may be driven from the gear 24 through a reverse idler pinion 29 in the well known manner. Such sliding action is effected in the usual way by means of a shifter fork 30, which engages in a groove 31 in the body of the gear 28, this fork being actuated by a shifter rod 32 slidably mounted in suitable bearings in the upper part of the cover portion of the casing 12. The shifter rod 32 is selectively actuated by a lever 33, of usual form, which may be manually operated by the vehicle driver in the well known manner. Thus in the illustrated embodiment of the invention, gear 28 may be moved to mesh with gear 23, to provide a first speed, or connected through pinion 29 to gear 24 to provide a reverse. Second speed is provided by connecting the constant mesh gear 26 to the shaft 10, and third or high speed is secured by coupling the shafts 10 and 15, thus providing a direct drive.

To provide the second and high speed connections described, the forward portion of the shaft 10 is provided with a clutch device which is slidably secured to the shaft between the gears 25 and 26. This device constitutes a splined hub portion 34, slidably mounted on the splines of the shaft 10 and rotatable therewith, radial web portions 35, and axially disposed rim portions 36 which are provided with internal splines or teeth 37. These teeth 37 are adapted for connection either to clutch teeth 38, formed on the shaft end 14 adjacent the pinion 25, or to clutch teeth 39 formed on the body of the gear 26, these clutch teeth 37, 38 and 39 being of the same pitch. To effect sliding movement of the clutch device, the clutch hub is provided with a shifter groove 42, actuated by a shifter fork 43, which is connected to a shifter rod 44 similar to the rod 32 and likewise selectively operated by the gear shift lever 33. It will be evident that when the clutch hub is in engagement with the teeth 39, the constant mesh gear 26 is locked to the shaft 10, thus providing the second speed, and that when the teeth 38 are engaged with the clutch hub, the shafts 10 and 15 are directly coupled, thus providing the third speed which is a direct drive.

To perform the clutch operation just described without shock or clash, this invention provides a synchronizing device adapted to bring the pairs of clutch teeth 37—38 or 37—39 to the same speed before positive engagement through means of the clutch hub 34. For this purpose, I provide clutch devices of a rolling type.

The inner wall of the web portions of the clutch hub are of conical form, as indicated at 45 and 46, and the rear end of the drive shaft is in the form of an extension 47 adapted to be telescoped by the front clutch hub web while the front end 48 of the gear 26 is in the form of an extension adapted to be telescoped by the rear clutch hub web. A plurality of parallel axially extending grooves 49 are formed in the periphery of the shaft end 47 and in the periphery of the gear end 48. The grooves in the shaft end increase in depth forwardly while the grooves in the gear 26 increase in depth rearwardly. A stop ring 49' is secured to the ends of the extensions and a retainer ring 50 encircles each of the extensions. Within each groove, I propose to provide a ball as indicated at 51, such balls projecting through apertures formed in the retainer rings. Coil springs 52 are arranged in the grooves and exert pressure against the inwardly extending tongues 60 of the retainer rings, which project into the grooves, in a direction urging them toward the ends of the extensions. As the balls are moved with the retainer rings they normally lie in the grooves at the ends of the extensions bearing against the stop rings 49'.

The side walls 54 forming the ends of the slots extend at an angle in opposite directions, thus increasing the width of the grooves at this point circularly of the extensions. The diameter of the balls and the depth of the grooves are such that when the clutch device is moved axially from a neutral position, the cone surface telescoping the extension will engage the balls carried thereby, whereupon relative rotation of the extension and the hub will move the balls against the angular walls of the grooves. Frictional resistance will thus bring the hub and the extension to the same speed before the teeth 37 engage with either the clutch teeth 38 or the clutch teeth 39, thus synchronizing the same before positive clutching relation takes place.

When the extension and the hub have thus been brought to the same speed, there is no pressure in a rotational direction against the balls and the continued axial clutch hub movement toward clutching position will force the balls into the deeper portion of the grooves so that they exert only a slight friction against the extension and the hub web. The spring pressure is such that the balls will be maintained in frictional contact with the cone extension surfaces during the major portion of the range of hub clutching movement, and thus there will always be at least a slight frictional pressure exerted tending to hold the extensions and the hub at the same speed before positive clutching takes place. Initial frictional engagement of the balls with the cone surface and the angular walls of the grooves will quickly bring the extension and the clutch hub to the same speed so that hesitation in the clutch shifting movement is not required in order to insure synchronization before positive clutching.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a transmission mechanism, a driving member, a driven member, an axially slidable clutch device splined to one of the members and engageable positively with the other member, said clutch device having a cone face, an end extension on the member adapted to be engaged by the clutch device, said extension being adapted to be telescoped by the cone face, and rolling friction clutch means between the extension and the cone face engageable upon initial shifting of the positive clutch toward engaging relation.

2. In a transmission mechanism, a driving member, a driven member, an axially slidable clutch member splined to the driven member and shiftable to positively engage the driving member, said clutch member having an undercut cone surface in the end adjacent the driving member, an end extension on the driving member adapted to be telescoped by the cone surface of the clutch member, and rolling friction clutch means between the extension and the cone surface to synchronize the clutch member and the driving member prior to positive clutch engagement.

3. In a transmission mechanism, a driving member, a driven member, an axially slidable positive clutch device splined to one of the members and engageable with the other of said members, an undercut cone face in one end of the clutch device, an extension on the end of the engageable member adapted to be clutched, and rolling friction synchronizing means intermediate the extension and the undercut cone face.

4. In a transmission mechanism, a driving member, a driven member, an axially slidable positive clutch device splined to one of the members and engageable with the other member, said clutch device having an inwardly extending cone surface at one end, an end extension on the engageable member having axially extending slots in the periphery thereof, the bottom of said slots being inclined oppositely to the cone angle, balls in the slots, and means normally urging the balls toward the outer end of the slots, said cone surface engaging the balls upon initial shifting of the friction clutch and synchronizing the clutch device and the engageable member.

5. In a transmission mechanism, a driving member, a driven member, an axially slidable positive clutch device splined to one of the members and engageable with the other member, said clutch device having an inwardly extending cone surface at one end, an end extension on the engageable member having axially extending slots in the periphery thereof, the bottom of said slots being inclined oppositely to the cone angle, balls in the slots, ball retaining means, and means normally urging the balls toward the outer end of the slots, said cone surface engaging the balls upon initial shifting of the clutch device and synchronizing the clutch device and the engageable member.

6. In a transmission mechanism, a driving member, a driven member, an axially shiftable positive clutch device splined to one of the members and engageable with the other member, said clutch device having an inwardly extending cone surface at one end, an end extension on the engageable member having axially extending slots in the periphery thereof, the bottom of said slots being inclined oppositely to the cone angle, balls in the slots, ball retaining means encircling the slots, and means normally urging the retaining means toward the outer end of the slots, said cone surface engaging the balls upon initial shifting of the clutch device and synchronizing the clutch device and the engageable member.

7. In a transmission mechanism, a driving member, a driven member, an axially slidable positive clutch device splined to one of the members and engageable with the other member, said clutch device having an inwardly extending cone surface at one end, an end extension on the engageable member having axially extending slots in the periphery thereof, the bottom of said slots being inclined oppositely to the cone angle, balls in the slots, ball retaining means encircling the extension and the slots therein, and spring means in the slots engaging the ball retaining means and normally urging the same toward the shallow end of the slots, said cone surface engaging the balls upon initial shifting of the clutch device and synchronizing the clutch device and the engageable member prior to connection.

8. In a transmission mechanism, a driving member, a driven member, an axially slidable positive clutch device splined to one of the members and engageable with the other member, said clutch device having a cone surface at one end, an end extension on the engageable member having axially extending slots in the periphery thereof, the bottom of said slots being inclined oppositely to the angle of the cone surface, balls in the slots, a ball retaining ring surrounding the slots in the extension, said ring having fingers extending into the slots, an end ring on the extension arranged to prevent axial displacement of the balls from the slots, and coil springs in the slots engaging with the fingers of the retaining means.

9. In a transmission mechanism, a driving member, a driven member, an axially slidable positive clutch device splined to one of the members and engageable with the other member, said clutch device having an inwardly extending cone surface at one end, an end extension on the engageable member having axially extending slots in the periphery thereof, the bottom of said slots being inclined oppositely to the angle of the cone surface and having the outer ends thereof flared, balls in the slots, ball retaining means surrounding the slots in the extension and movable axially, and spring means in the slots engaging the ball retaining means to normally urge the balls into the flared ends of the slots, said cone surface engaging the balls in driving relation against the flared ends of the slots upon initial shifting of the clutch device and synchronizing the positive clutch device and the engageable member prior to their connection.

10. In a transmission mechanism, a driving member, a driven member, an axially slidable clutch device splined to one of the members and engageable positively with the other member, said clutch device having a cone face, an end extension on the other member adapted to be telescoped and engaged by the clutch device, and friction clutch means including axially movable rollers between the extension and the cone face engageable upon initial shifting of the clutch device toward positive driving engagement.

11. In a transmission mechanism, a driving member, a driven member, an axially slidable clutch device splined to one of the members and engageable positively with the other member, said clutch device having a cone face, an end extension on the other member adapted to be positively engaged by the clutch device, and friction clutch means comprising axially yieldable rollers between the extension and the cone face and engageable upon initial shifting of the clutch device toward positive driving relation.

WALTER R. GRISWOLD.